Dec. 12, 1961  W. HANOT ET AL  3,012,665
MULTI-FUNCTION BOTTLE GAGING APPARATUS
Filed April 15, 1959  7 Sheets-Sheet 1

INVENTORS.
WILLIAM HANOT
JAMES E. DAVIS
BY
Mathis and Graybeal
ATTORNEYS

INVENTORS
WILLIAM HANOT
JAMES E. DAVIS
BY
Mathis and Graybeal
ATTORNEYS

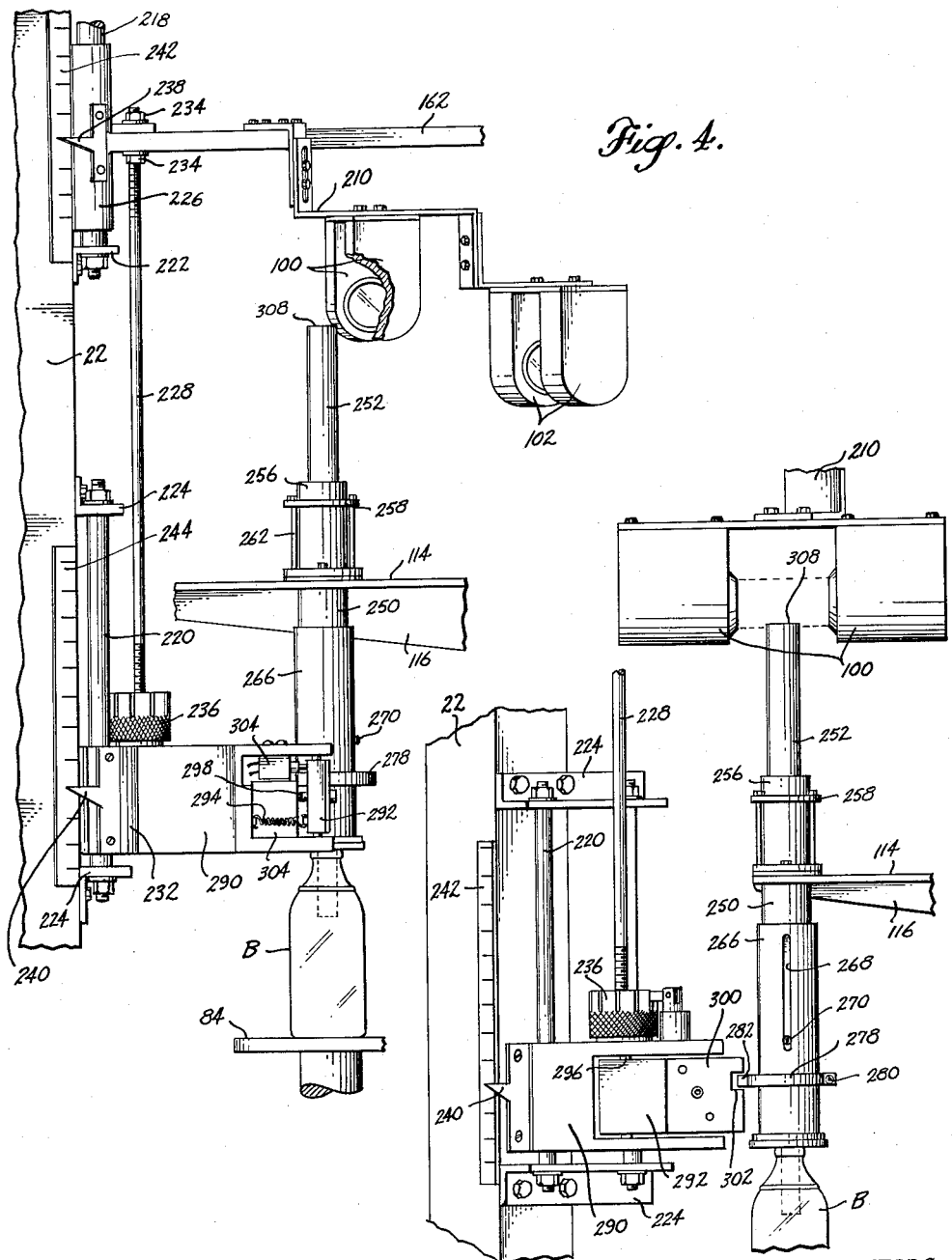

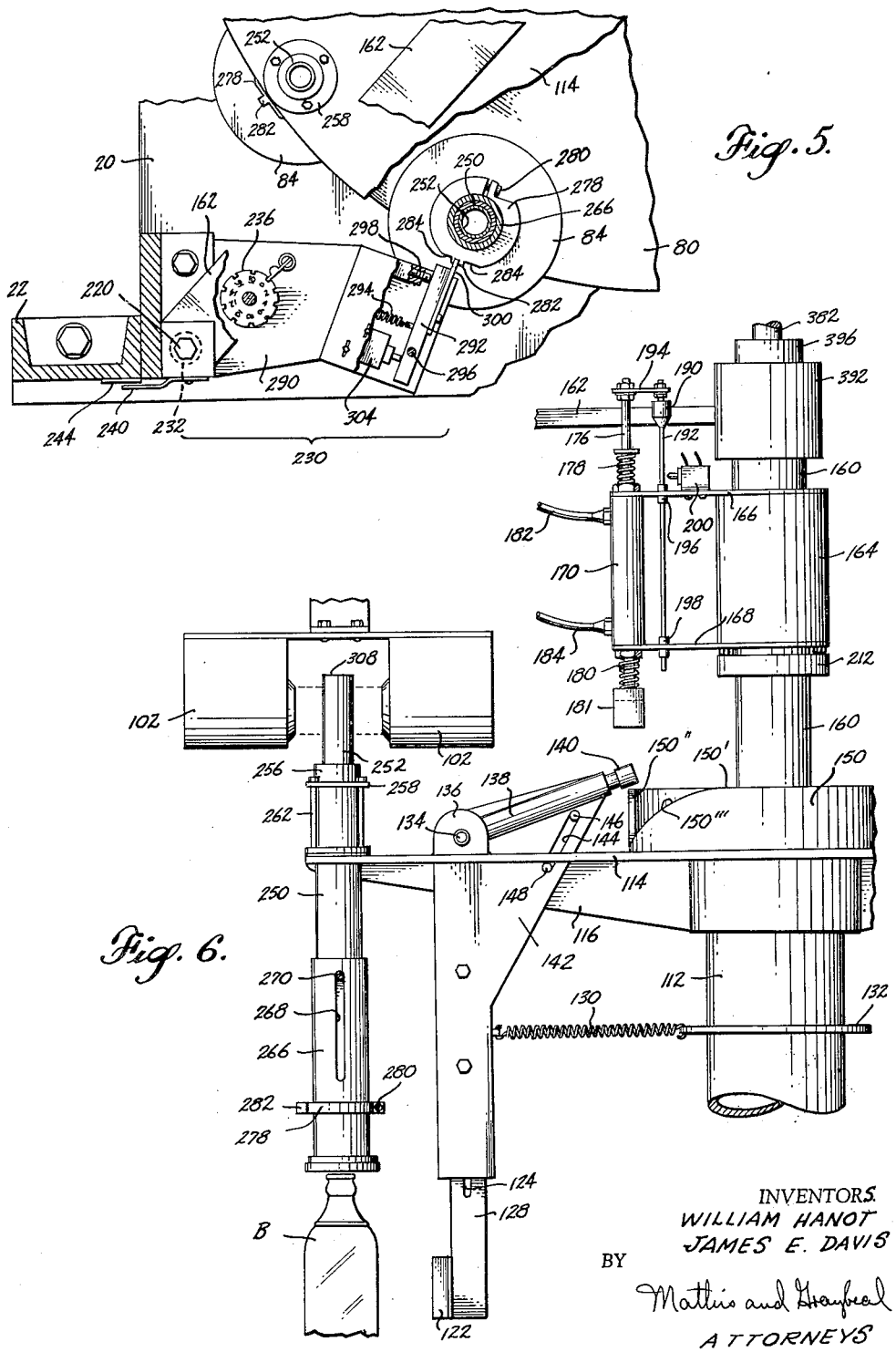

Dec. 12, 1961 W. HANOT ET AL 3,012,665
MULTI-FUNCTION BOTTLE GAGING APPARATUS
Filed April 15, 1959 7 Sheets-Sheet 5
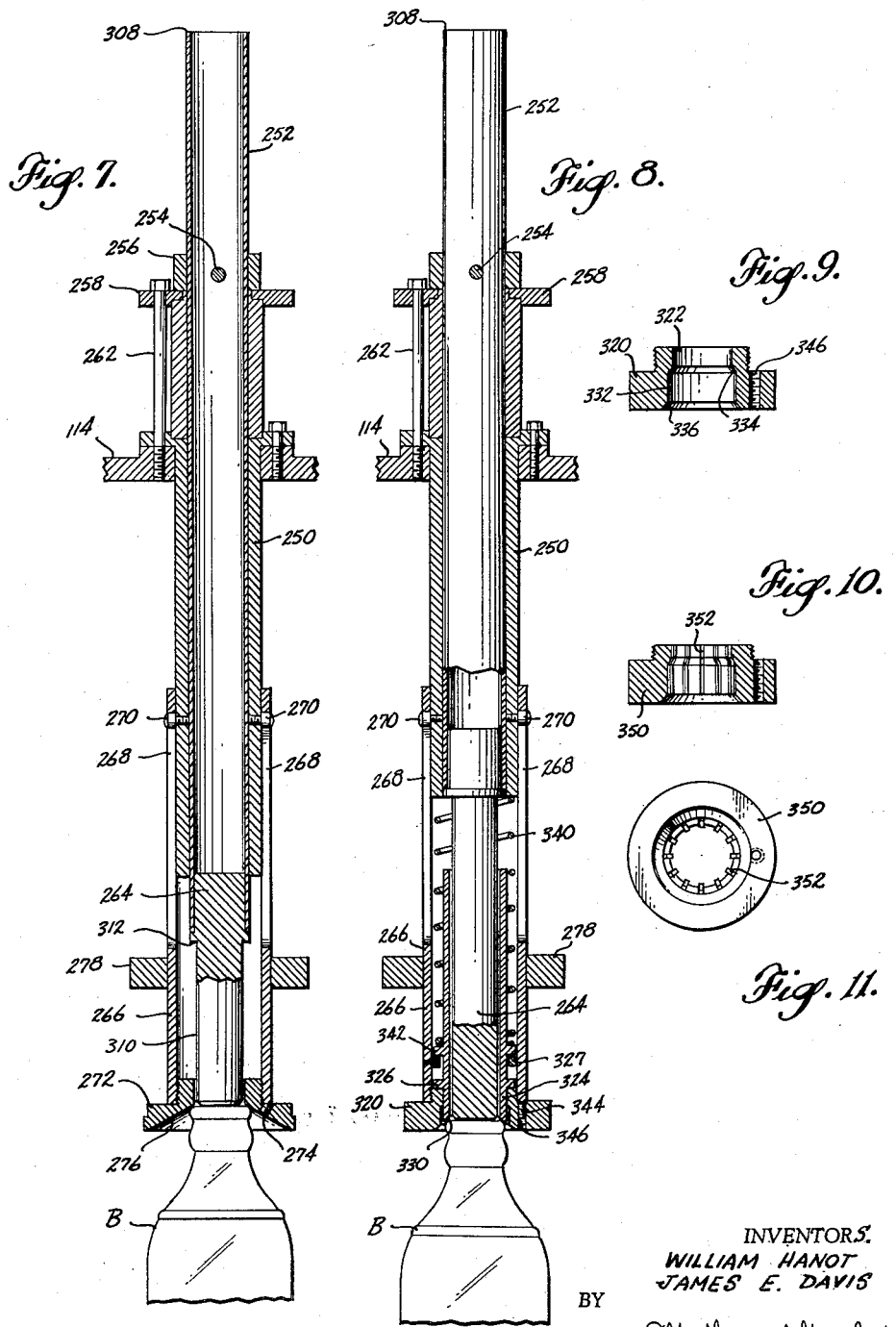
INVENTORS.
WILLIAM HANOT
JAMES E. DAVIS
BY
Mattis and Graybeal
ATTORNEYS INVENTORS
WILLIAM HANOT
JAMES E. DAVIS
BY
Mattis and Graybeal
ATTORNEYS Dec. 12, 1961   W. HANOT ET AL   3,012,665
MULTI-FUNCTION BOTTLE GAGING APPARATUS
Filed April 15, 1959   7 Sheets-Sheet 7

INVENTORS.
WILLIAM HANOT
JAMES E. DAVIS
BY
Mattis and Graybeal
ATTORNEYS

United States Patent Office 3,012,665
Patented Dec. 12, 1961

3,012,665
MULTI-FUNCTION BOTTLE GAGING APPARATUS
William Hanot and James E. Davis, Seattle, Wash., assignors to Northwestern Glass Company, Seattle, Wash., a corporation of Washington
Filed Apr. 15, 1959, Ser. No. 806,503
24 Claims. (Cl. 209—80)

The present invention relates to apparatus for automatically dimensionally gaging containers or the like, and more particularly relates to apparatus for high-speed dimensional gaging and inspection of articles such as bottles, jars and the like as to various dimensions important to subsequent use thereof, such as the so-called choke, maximum and minimum height and lean dimensions, and also the exterior neck or crown finish as to the locking ring and reinforcing ring dimensions of the article.

Commercial manufacture of articles such as cappable bottles and the like by automatic blowing and annealing equipment characteristically produces at least a few non-perfect articles which must be rejected before the articles are fed through automatic filling equipment or the like. Otherwise jamming and sometimes dangerous mal-functioning of the article utilization equipment will occur. Filling machines, for example, commonly employ filling tubes extending substantially into the neck portion of the article and the interior neck or so-called "choke" gaging or inspection of such articles has presented a particularly difficult problem in commercial practice, especially where the containers are non-transparent or opaque. Visual inspection is a tedious and exacting procedure and commercial production throughput rates make it a practical necessity that positive, rapid and reliable automatic gaging equipment be employed to achieve what is known as "single-line" inspection, with no or only a minimum visual inspection requirement.

Various relative complex and intricate mechanisms for automatically gaging container dimensions have been developed. Characteristically, such equipments commonly employ overhead lifting means, as by vacuum, coupled with article riding contact bars, gaging fingers or like elements and operating various ejection actuator means to reject non-perfect articles. One form of prior article gaging involves reflecting a light beam directly from the article surface being gaged. Also hand type so-called "go or no go" gages are used, on a spot check basis, to supplement visual inspection techniques.

Typical of prior apparatus for gaging bottles and the like to inspect and gage the neck interior dimension or "choke," and involving elaborate lifting mechanisms superimposed over a line of articles, are the equipments disclosed in Fedorchack et al. U.S. Patent No. 2,352,091, and McNutt et al. U.S. Patent No. 2,596,342. These equipments, as well as other known equipments of the same type in the field, gage and inspect only as to the choke dimension, and are not specifically concerned with the other article dimensions which must also be uniform within close tolerances, such as height, locking ring size and configuration, and reinforcing ring size and configuration.

Standard nomenclature for bottle finish, as adopted by the Glass Container Manufacturer's Institute, Inc., uses the term "choke" to identify the neck interior dimension, uses the term "crown finish" to identify the overall neck exterior configuration in popular use, sealed by a crown closure or cap, uses the term "locking ring" to denote the upper lip or bead around which the crown closure is secured, and uses the term "reinforcing ring" to denote the bulging portion of the crown finish below the locking ring.

It is an object and feature of the present invention to provide a fully automatic gaging apparatus for inspecting bottles or like articles as to several of their dimensions, and to eject articles which do not conform to such dimensions within close tolerances, which apparatus is capable of single-line inspection at high throughput rates, is versatile as to use for gaging a wide variety of article types, is substantially maintenance-free over extended periods of operation, and is constructionally compact to simplify installation.

It is a related and somewhat more specific object and feature of the present invention to provide a gaging mechanism of the character indicated wherein each article passing therethrough is automatically inspected for choke, maximum and minimum height, and lean dimensions and optionally also to crown finish, particularly locking ring and reinforcing ring sizes and configurations.

It is a further related object and feature of the invention to positively and simply gage the choke, height and crown finish of an article such as a bottle or the like, without necessity of rotation of an article about its own axis during the gaging operation. This latter advantage of the invention is directly attributable to novel gaging assemblies and a novel manner of article manipulation during its transit through the gaging equipment, whereby the article is carried on a vertically movable support and elevated a predetermined degree, with a vertically yieldable choke gaging assembly concentrically superimposed over each article support and moving therewith, and whereby the height dimension of the article is similarly detected by vertically movable means on or carried by the vertically yieldable choke gaging assembly, the apparatus further employing separate means for detecting imperfect choke dimension on the one hand and imperfect height dimension on the other hand with both such detection means being stationarily positioned on the gaging apparatus.

A still further object and advantage of the present invention is provision of separate choke dimension and height dimension gaging mechanisms, wherein the choke dimension gaging mechanism also functions to measure lean dimension, and in certain instances additionally to measure the crown finish dimensions. Yet another object and advantage of the present invention is to provide choke and height gaging assemblies of a nature so that the apparatus is readily and simply adaptable to other article sizes and types by rapid substitution of interchangeable elements, and wherein tolerance ranges as to any particular article dimension being gaged can be rapidly and simply adjusted with little or no loss of production time.

Yet another object and advantage of the present invention is to provide article ejection at one station of the apparatus, regardless of the nature of the gaged deviation of the article.

Still another object and advantage of the present invention is to provide for multi-function gaging elements whereby gaging tolerances as to the height dimension of the article and the choke dimension of the article are independently adjustable.

An additional object of the present invention is to provide an article gaging and ejection mechanism wherein article ejection is controlled electronically and the ejection circuit is enabled or "impulsed" only when ejection of an article is desired.

Further objects and advantages of the invention include mechanism for manipulation of articles of the character indicated by means of subjacent article supports, carrying and moving along with the articles, rather than by any complex, moving, overhead lift mechanisms.

Additional objects and advantages of the present invention include the provision of article gaging apparatus wherein the apparatus is simple to construct and maintain, made up largely of duplicate elements interchangeably adaptable or simply adjustable to varying article sizes and types; wherein each gaging assembly of the apparatus has its own ejector mechanism, with the ejector mechanism being disabled except at the ejection station; and wherein all article supports, gaging assemblies and ejector mechanisms are arranged on a single, vertically adjustable spider type assembly, rotating thereon in concert, with the gaging station and ejection station in fixed positions radially of the spider, all gaging functions being performed substantially simultaneously at said gaging station.

These and other objects, advantages and features of the present invention will be apparent to those skilled in the art from a consideration of certain typical and therefore non-limitive embodiments thereof, as presented by the following description and following drawings, wherein like numerals refer to like parts, and wherein.

Figure 1:
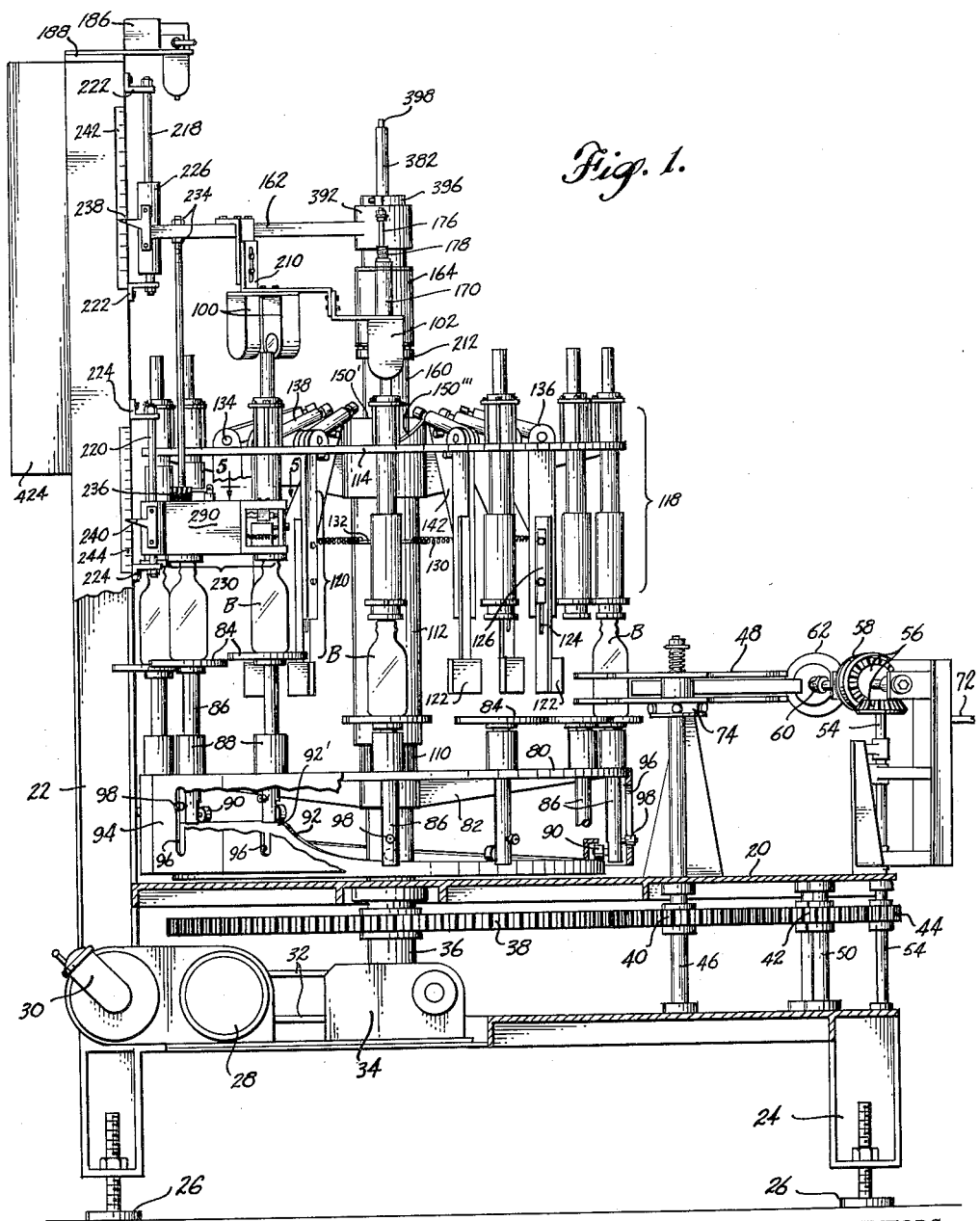
FIG. 1 is a view in side elevation of one embodiment of the invention, with various parts broken away and shown in cross-section.
Figure 2:
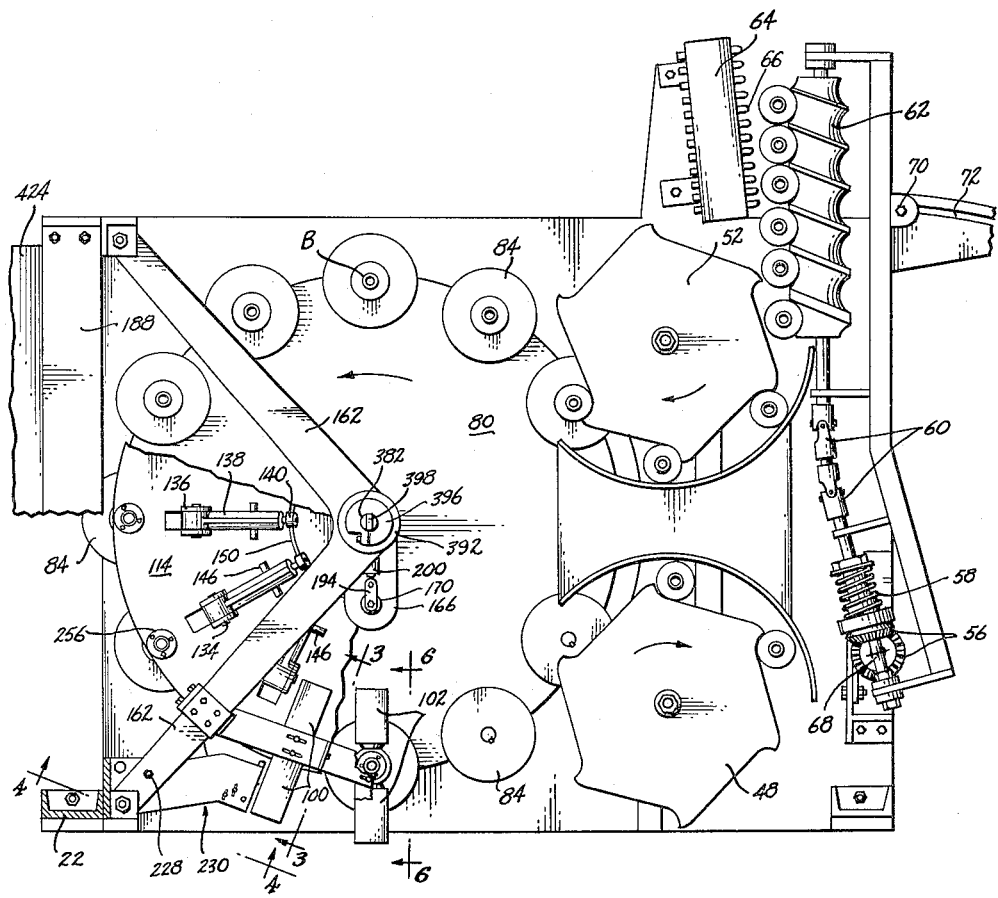
FIG. 2 is a plan view, also with certain parts broken away and shown in cross-section, of the equipment shown in FIG. 1.

FIG. 3 is a fragmentary view in side elevation of a gaging assembly when situated at the gaging station of the equipment, also showing certain of the choke dimension detecting elements and height dimension detecting elements thereat, the view of said FIG. 3 being in a plane extending substantially radially of the spider, as viewed from the outfeed side of said gaging station, i.e. substantially along line 3—3 of FIG. 2;

FIG. 4 is a further view in side elevation, fragmentary in character, of an article and associated gaging assembly at the gaging station of the equipment, the view being taken substantially perpendicularly across a radial plane of the spider, i.e. substantially along line 4—4 of FIG. 2;

FIG. 5 is a fragmentary, plan view with certain elements shown in cross-section, showing an article, article support and gaging assembly at the gaging station, and also showing certain of the height dimension detecting elements, taken substantially along line 5—5 of FIG. 1;

FIG. 6 is a side elevational view similar to the view of FIG. 3, taken radially of the spider from the outfeed side of the ejection station, i.e. substantially along line 6—6 of FIG. 2;

FIG. 7 is a fragmentary, vertical cross-sectional view of an article and gaging assembly, showing the relative position of the various parts of the latter with respect to the article and with respect to each other at the gaging station, the form of gaging head being of the type which measures height but not crown finish sizes;

FIG. 8 is a vertical cross-sectional view similar to the view of FIG. 7, showing a gaging assembly having a gaging head of a modified form, the gaging head shown in FIG. 8 being of a type which detects deviations in crown finish configurations as well as height dimension;

FIG. 9 is a detailed view on a somewhat enlarged scale, showing a vertical cross-section of the type of gaging head forming a part of the gaging assembly shown in FIG. 8;

FIG. 10 is a detailed view in vertical cross-section of yet another form of gaging head, designed to measure both height and crown finish configurations, with a ribbed interior design to facilitate retraction of certain types of articles therefrom.

Figure 12:
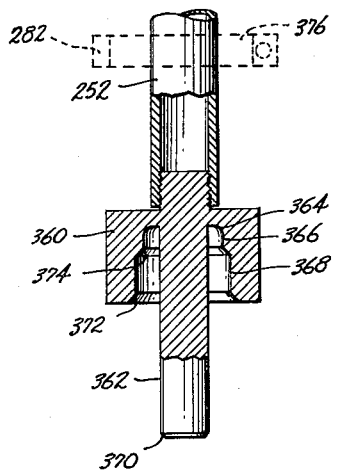

FIG. 11 is a bottom view of the gaging head shown at FIG. 10;

FIG. 12 is a fragmentary view in vertical cross section of yet another form of gaging element combination usable in the gaging assemblies of the invention, wherein the choke gaging finger and the various height and crown finish gaging surfaces and bores of the gaging head are integrally arranged.

Figure 13:
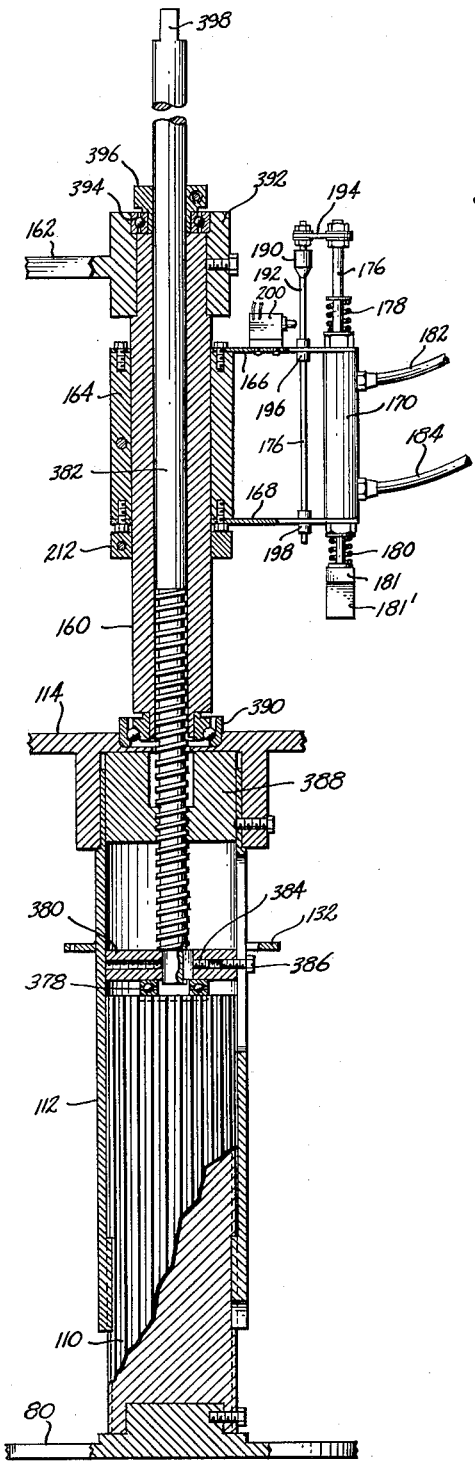
Figure 14:
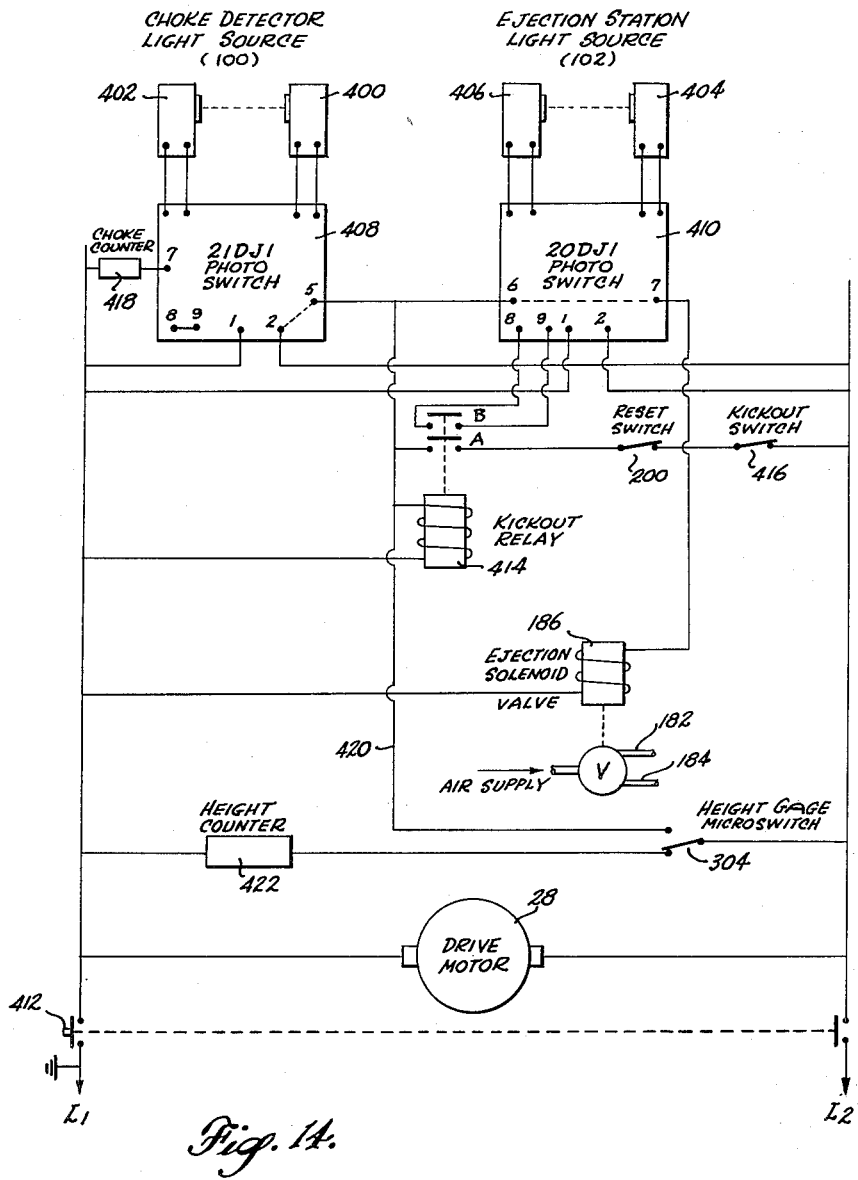

FIG. 13 is an enlarged fragmentary view in vertical cross-section centrally through the upper portion of the spider post, showing the threaded means for adjusting the height of the upper spider assembly; and FIG. 14 is a simplified, schematic drawing showing the energization circuitry for the ejection actuator means.

Turning now to a more specific consideration of a typical embodiment of the invention as shown in FIGS. 1–7, the apparatus comprises a baseframe 20 with uprights 22 extending therefrom, with lower ends forming legs, the baseframe 20 also mounting a pair of legs 24, each of such legs being provided with adjustable feet 26 for leveling the apparatus.

Baseframe 20 mounts a drive motor 28 having a variable speed output controlling mechanism 30, the motor output being transmitted by belt 32 to gear box 34 which in turn rotates upright shaft 36, directly rotatively driving the hereinafter discussed spider assembly of the mechanism and also driving a gear train comprising gears 38, 40, 42 and 44. Gear 40 acts through shaft 46 to drive outfeed star wheel 48, gear 42 acts through shaft 50 to drive infeed star wheel 52, and gear 44 acts through shaft 54, bevel gears 56, a positive position, spring loaded clutch 58 and universals 60 to drive infeed worm 62.

The attitude of infeed worm 62 with respect to article guide 64 and its flexible brass fingers 66 and with respect to infeed star wheel 52 is adjustable about a pivot axis 68 coinciding with the axis of shaft 54 and lockable in any preset angular position by means of bolt 70 and cam plate 72, to accommodate the infeed mechanism to any particular article size presented by a given production run.

Each of the drive linkages for outfeed star wheel 48 and infeed star wheel 52 includes a spring-loaded, six-position clutch, such clutch on outfeed star wheel 48 being shown in FIG. 1 at 74.

The positive position clutching of the respective infeed and outfeed star wheels 52 and 48, coupled with the positive position clutching provided by clutch 58 as to the infeed worm 62, maintains synchronization of the worm 62 and infeed star wheel 52 at the infeed portion of the mechanism, as well as synchronization of the outfeed through outfeed star wheel 48. Further, both infeed star wheel 52 and outfeed star wheel 48 are synchronized with the rotation of the spider assembly by shaft 36 so that each article is synchronously delivered to its work support on the spider assembly by infeed star wheel 52 and, after being gaged, is synchronously removed from the work support by outfeed star wheel 48.

Basically, the spider assembly is composed of two parts; a lower part functioning to support and convey the articles past a gaging station and an ejection station, and an upper part functioning to synchronously carry a series of gaging assemblies and ejector assemblies each in respective radial position with an associated article support, the gaging and ejector assemblies being operationally independently movable as to height with respect to the work supports and with respect to one another.

The lower part of the spider assembly is mounted on and rotated by shaft 36 and includes an article support mounting plate 80, its bracing members 82, and a series of article supports 84, each respectively equi-spaced circumferentially about shaft 36 and each having a support rod 86 vertically movable in a guide 88 on mounting plate 80, the vertical movement of said article supports 84 being caused by a cam follower 90 mounted at the bottom of each support rod 86 and riding on fixed annular camway 92 (fastened to baseframe 20) during the rotation of the spider assembly. The lower spider assembly part further comprises an annular shield 94 having a slotted keyway 96 at each article support location, in which rides a key pin 98, extending outwardly from near the lower end of each support rod 86, preventing rotation of the associated article support 84 about its own axis.

It will be noted with respect to the series of article support assemblies and camway 92 that the mechanism functions to allow the article supports 84 to receive the articles from infeed star wheel 52 at a time when a given article support 84 is at a predetermined, low level, vertically considered. As rotation of the spider assembly and any said given article support 84 about the axis of the spider assembly progresses, the level of the article support progressively raises gradually until reaching substantially its highest level at the gaging station of the equipment, which station is radially coincident with choke detector light source 100, the high point of camway 92 coinciding with such article gaging station being indicated on FIG. 1 at 92'. The circumferential configuration of camway 92 is also such that, immediately after the high point thereof at the gaging station, its slope drops off to return substantially to the lower, initial level by the time the article support 84 progresses to the next position illustrated in FIG. 1, which latter position is substantially coincident with the ejection station of the mechanism, i.e. ejection station light source 102.

With respect to the manner of elevation of the article supports while approaching and at the gaging station, and the progressive return thereof to an initial level after gaging, it is also to be noted that the beam level of choke gaging light source 100 is positioned so that the upper end of the gaging assembly is at a level below the center of the light source beam and the beam is not interrupted when the gaging assembly detects a normal neck interior dimension and that the ejection station light source 102 is positioned low enough with respect to the path of travel of the upper ends of the gaging assemblies to have the light beam thereof interrupted by every gaging assembly. Further, the gaging head of each gaging assembly is in fact preferably actually separated slightly from the top of the article at the ejection station because of the return of the article support to its initial level by camway 92, so the gaging head of the gaging assembly will not interfere if the article is ejected.

Having now considered in detail the nature of the lower part of the spider assembly, attention will now be given to the upper part thereof, to show more specifically the nature of the various gaging assemblies and ejector assemblies, as well as the means by which the upper part of the spider assembly is vertically adjustable with respect to the lower part of the spider assembly. Splined shaft 110, emerging upwardly from the work support plate 80, rotates therewith and has splined thereto an outer sleeve 112 fastened at its upper end to a threaded assembly, discussed in more detail hereinafter in connection with FIG. 13, by means of which upper support plate 114 is vertically adjustable. Support plate 114 is rotated through shaft 110 and sleeve 112 in synchronism with work support mounting plate 80. Support plate 114 has strengthening ribs 116 and mounts a series of circumferentially disposed gaging assemblies, generally indicated at 118, each in superposed position with respect to an associated work support 84, as well as a series of circumferentially disposed ejector assemblies, generally indicated at 120, each of which is in radial alignment inwardly of its associated gaging assembly 118 and article support 84. The exact constructional nature of each gaging assembly 118 will be considered hereinafter in connection with the fragmentary views of certain forms thereof as presented by FIGS. 3, 6, 7 and 8.

As to the nature of the various ejector assemblies, it will be seen that each comprises an ejector foot 122, vertically adjustable as to height by means of slot 124 therein and bolt block 126 on ejector arm 128. Each ejector arm 128 is spring loaded to a substantially vertical position by an associated tension spring 130 connected between it and spring anchoring ring 132 on sleeve 112 of the spider assembly. Each ejector arm 128 is pivotally pinned at its upper end by bolt 134 to trunnion straps 136 on upper support plate 114 and integrally connected with an upper arm 138 having a free end 140 shaped in the form of a cam follower. Also interconnecting ejector arm 128 and upper arm 138 is a bracing plate 142 having a slot 144 in which are adjustably mounted respective upper and lower stop pins 146 and 148, by means of which the extent of outward throw of ejector foot 122 on actuation of the ejector assembly is limited (pin 146) and the "at rest" or normal vertical position of the ejector assembly is adjusted (pin 148).

Associated also with the series of ejector assemblies 118 is a non-rotating camway 150 of a configuration to present a stop surface at an ejector assembly disabling level substantially throughout the path of travel of the ejector assemblies except at the ejection station. Thus, and as partially shown in both FIGS. 1 and 6, ejector assembly disabling cam 150 presents a stop surface at a disabling level indicated at 150' to the various ends 140 of the ejector assemblies, except where it drops off sharply just before the ejection station, as indicated at 150" (FIG. 6), then rises somewhat gradually just after the ejection station, as indicated at 150'''.

To be considered also in conjunction with the cutaway nature of ejector cam 150 at the ejection station, is the nature of the ejector actuating mechanism itself. Specifically, non-rotating sleeve 160 situated concentrically above the spider assembly is braced by yoke 162 extending outwardly from mountings on uprights 22, the said sleeve 160 in turn having mounted thereon by means of adjustable bracket 164 and upper and lower mounting plates 166 and 168, an ejector actuating cylinder 170 of the double-action type, shown in FIG. 6 at its normal or "at rest" position. Ejector actuating cylinder 170 is assembled on said plates 166 and 168 by threaded end nuts 172 and 174 through which its rod 176 passes, the reciprocatory action of cylinder rod 176 being cushioned by floating compression springs 178 and 180. Rod 176 of cylinder 170 mounts at its lower end a cam actuator 181 presenting a downwardly sloping face 181' to the line of travel of the ends 140 of the ejector assemblies 120 when said ejector cylinder 170 is energized, the relative position of said sloping cam actuator 181 being such that when cylinder 170 is not energized, the ends 140 of the ejector assemblies 120 pass thereunder without being contacted or disturbed as to vertical position.

Ejector actuating cylinder 170 is selectively energized responsive to control initiated by either the choke gaging assembly or the height gaging assembly in a manner shown by control circuitry schematically presented by FIG. 14, discussed hereinafter. Segments of the lines connecting said cylinder 170 to a suitable source of supply of fluid under pressure are shown at 182 and 184, and the physical placement of the ejector solenoid valve on the assembly, as shown at FIG. 1, is indicated at 186 on span 188 across the upper ends of frame uprights 22.

Another elemental feature of the ejector actuating mechanism, directly involved in the control circuitry of the apparatus, is reset actuator cam 190 at the upper end of reset actuator rod 192, in turn joined to the upper end of cylinder rod 176 by strap 194 and reciprocable therewith through guide sleeves 196 and 198 in respective cylinder mounting plates 166 and 168. A normally closed reset microswitch 200 is situated in the path of travel of the sloping lower surface of reset actuator cam 190 so as to be momentarily opened by said cam with each downward stroke of ejector actuator cam 181. As will also be discussed more fully hereinafter in connection with the control circuitry shown at FIG. 14, said reset microswitch 200 functions to disable the interlock of the kickout relay of the control system.

The upper part of the spider assembly mounting the gaging assemblies and the ejector assemblies is vertically adjustable independently of the lower part of the spider assembly. Certain of the non-rotating elements associated with the upper part of the spider assembly light sources 100 and 102 are vertically and rotationally adjustable independently of the upper part of the spider assembly by means of adjustable mounting brackets 210. The ejector activating assembly is vertically adjustable by means of the setting of lock ring 212 on sleeve 160 and rotationally by means of the setting of bracket 164.

Mounted on the pair of frame uprights 22 are an upper pair of guide bolts 218 and a lower guide bolt 220, each spanning respective mounting straps 222 and 224 on the frame uprights 22. The outer ends of the arms of yoke 162 terminate in sleeves 226, respectively slidable on their associated guide bolts 218, and one of said arms of yoke 162 has depending therefrom an adjustable rod 228 from which depends the height gaging assembly, generally indicated at 230 and discussed more fully hereinafter, the said height gaging assembly 230 including a guide sleeve 232 encircling and sliable on guide bolt 220. In terms of adjustment as to height, vertical adjustment of the upper part of the spider assembly by the mechanism shown in detail in FIG. 13 results in a degree of sliding movement of guide sleeves 226 on guide bolts 218 and comparable movement of height gaging assembly 230 and its guide sleeve 232 on guide bolt 220, while relative adjustment of rod 228 by resetting of nuts 234 at the upper end thereof or by the vernier threaded adjustment 236 on the height gaging assembly itself results in relative movement of only the height gaging assembly 230. As will be readily understood, the variety of adjustment means available as to the upper part of the spider assembly, as to the non-rotative elements above the spider assembly, and as to the height gaging assembly itself, permit wide variety, versatility and flexibility as to the dimensions of the articles gageable by the equipment.

As shown in the fragmentary views of FIGS. 3 and 4, one of guide sleeves 226 and guide sleeve 232 preferably have associated therewith a respective pointer 238 and 240 and associated scale means 242 and 244, giving direct reading indication of the height levels at which the associated components of the equipment are set. As indicated in FIG. 5, vernier adjustment 236 for the height gaging assembly 230 is also direct reading and in one existing installation is designed to read directly in thousandths of an inch, clearly demonstrating the precise degree of height adjustment permitted by the equipment.

Next considering more specifically the elemental nature of each of the series of gaging assemblies 118, and noting FIGS. 6 and 7, for example, the gaging assemblies 118 each comprises a fixed guide sleeve 250 passing through and bolted to upper support plate 114 of the spider assembly, said guide sleeve 250 having a vertically movable, preferably hollow bore, choke tube 252 arranged axially therein, the said choke tube 252 having attached thereto near its upper end as by bolt 254 a stop collar 256, in turn normally at rest against ring 258 spaced above support plate 114 by sleeve 260 in turn retained in position by bolt 262.

Said choke tube 252 presents at its lower end a choke measuring finger or plug 264, the diameter of which is selected to pass freely into the neck of an article of proper interior neck dimension, FIG. 7 showing a fragment of a bottle in this relation.

Movably retained on the lower end of guide sleeve 250 is a height responsive sleeve 266 independently vertically movable with respect to choke tube 252 and its choke measuring finger 264. Such independent movement of said height responsive sleeve 266 is permitted by vertically extending slots 268 therein and screws 270 in said guide sleeve 250, said screws 270 serving as keypins preventing rotation of said height responsive sleeve 266.

Said height responsive sleeve 266 pivotally mounts at the lower end thereof gaging head 272 including a lock screw 274 and having an inwardly and upwardly sloping conical lower face 276 functioning to facilitate centering of the article mouth with respect to said gaging head 272 and choke finger 264 as the article B is raised by its article support 84. Also to be observed with respect to gaging head 272 as presented at FIG. 7 is the fact that although such measures article height, the conical lower face 276 thereof is not of a configuration to detect and gage the so-called locking ring and reinforcing ring dimensions of the crown finish of the article.

Height responsive sleeve 266 also adjustably mounts exteriorly and concentrically thereof a height ring 278, which is vertically adjustable on said sleeve 266 by means of bolt 280 (also see FIG. 5) and presents radially outwardly of the gaging assemly a height gaging cam tip 282, the height ring 278 being cut away at both sides of said cam tip 282 to minimize wear of the pivoted gaging plate of the associated height gaging assembly 230, discussed more fully hereinafter, such cutaway portions of height ring 278 being indicated at 284 (FIG. 5).

As will be apparent from the nature of height responsive sleeve 266, its mounting on guide sleeve 250 independently of choke 252, and the nature of the direct mounting of height ring 278 on said sleeve 266, the height dimension of the article B when the latter is raised by its work support 84 to a predetermined level at the gaging station is directly reflected by the relative height of said height ring 278.

Considering further certain of the elemental details of the gaging assembly 118 as presented by FIG. 7, it will be seen that interior neck dimension of the article B is gaged by choke finger 264 of choke tube 252 passing into the neck of article B. Any interior obstruction to such transit of finger 264 is reflected by lifting of choke tube 252 so that its upper tip 308 rises above the level of the light beam of light source 100 at the gaging station, in turn generating an input impulse to the control circuit of the assembly. As will be understood from an inspection of the configuration of the lower end of choke finger 264, it is preferably of a vertical dimension greater than the normal rise of the article B so that said choke tube 252 is lifted only when the neck interior dimension of the article B is constricted or "choked." In all events, the lip of the article B preferably does not reach the ledge 312 of the choke measuring element 264, regardless of the choke condition of said article B.

Proceeding to a detailed consideration of the nature of the height gaging assembly 230, such comprises a horizontally extending mounting arm 290 (see FIGS. 3, 4 and 5) extending from the aforesaid guide sleeve 232 of the assembly and presenting at its other end coincident with the gaging station a pivotally movable height gaging plate 292 (FIG. 5), spring loaded by spring 294 to present a normal attitude substantially alined radially of the spider assembly and yieldable about pivot pin 296 in a direction away from adjustable stop 298 when the outer end 300 of said plate 292 is contacted by a height ring 278 being either too high or too low to pass freely through slot 302 (FIG. 3) of said plate outer end 300. Thus, movement or non-movement of gaging plate 292 by cam tip 282 of height ring 278 dimensionally measures the height of the article B within a tolerance determined by the width of slot 302 as compared with the thickness of cam tip 282. This measurement is communicated to the control circuity of the mechanism by height gage microswitch 304 (FIG. 5).

FIGS. 8 and 9 present a modified form of gaging assembly, having in particular a modified form of gaging head functioning to simultaneously measure the height, locking ring and reinforcing ring dimensions of an article. Except as otherwise indicated, the various elements of the gaging assembly shown in FIG. 8 are identical with those shown in FIG. 7. In the instance of the gaging assembly of FIG. 8, however, the gaging head 320 has several interior bore dimensions, as perhaps best shown by the detail cross-sectional view thereof at FIG. 9. The dimension of the interior bore 322 of the gaging head 320 is of a size permitting movement of the head with respect to an article ejection sleeve 324 which functions to facilitate withdrawal of the article from the gaging head 320 upon retraction of the article on downward movement of its work support, said ejection sleeve 324 having ring portion 326 to retain the same in the assembly in the "at rest" position shown in FIG. 8. Ledge 327 arranged interiorly of sleeve 266 is positioned to be contacted by ring portion 326 of sleeve 324 when the article is seated in the gaging head and thus transmit the height dimension of the article to height ring 278. The lower surface 330 of raised ejection sleeve 324 and the bore 322 respectively function to gage article height and out of round or oversize of the locking ring of the article as it raises into the gaging head 320, it being noteworthy that as the sealing surface of the article raises the ejection sleeve 324 raises and permits the locking ring to nest in said bore 322 and against said surface 330. With the article in such position, bore 332 of gaging head 320 functions to likewise gage oversize and out of round with respect to the reinforcing ring of the article. If the article is overheight or underheight or if its crown finish is oversize or out of round as to either the locking or reinforcing ring configuration, then the height gage 320 is moved upwardly more or less than normal and height ring 278 on height responsive sleeve 266 is overheight or underheight and the height gaging plate 292 is triggered.

Sloping portions 334 and 336 of gaging head 320 accomplish a centering function similar to that of surface 276 of gaging head 272 earlier discussed in connection with FIG. 7, and sloping surface 330 at the lower end of ejection sleeve 324 likewise contributes to the centering action.

Particularly with relatively light articles, gaging of the locking ring and reinforcing ring dimensions by a gaging head of the type shown at 320 may on occasion involve some tendency of the articles to "hang" in the gaging head after the associated work support 84 retracts. To obviate any such tendency, the gaging assembly shown at FIG. 8 includes a coil spring 340 exerting light compression between the lower end of guide sleeve 250 and ring 342 on sleeve 324, the force of said spring 340 being insufficient to impede the nesting of the locking ring and reinforcing ring of an article in the head 320, but facilitating downward return of the lower end of ejection sleeve 324 when the article support 84 moves downwardly away from the bottom of the article. As will be apparent, spring 340 can be dispensed with in certain instances and as desired, as when relatively heavy articles are being gaged.

Lock screw 344 in threaded bore 346 of the gaging head 320 functions in the same manner as lock screw 274 of gaging head 272, discussed with respect to FIG. 7.

FIGS. 10 and 11 present yet another form of gaging head, the gaging head 350 there shown having axially extended ribs or flanges 352, serving to reduce the area of contact of the gaging surfaces with the surfaces of the article, the bore configurations being otherwise comparable to the form of gaging head shown at 320 in FIGS. 8 and 9.

FIG. 12 presents a fragmentary view in vertical cross-section, illustrating a type of gaging head representing a further variation in the gaging elements and gaging assemblies of an equipment embodying the invention. In the gaging means of FIG. 12, the gaging head 360 is mounted on the bottom of tube 252 and translates detected dimensional irregularities to said tube 252 in basically the same manner as does choke finger 264 of the previously discussed gaging assemblies. However, in the form of gaging head 360 shown at FIG. 12, the head comprises an integrally formed choke finger 362 joined by a sealing surface contacting ledge 364, and also having a concentrically arranged locking ring engaging bore 366 and reinforcing ring engaging bore 368, the respective sloping surfaces 370, 372 and 374 performing centering functions in like manner as do the comparable sloping surfaces of the heads earlier considered. Since the gaging head shown in FIG. 12 reflects all gagements as to choke (finger 362), height (ledge 364), locking ring (bore 366), and reinforcing ring (bore 368) in terms of relative degree of lift of tube 252, the sole deviation detection device necessary therewith is choke light source 100, and the height gaging mechanism, including sleeve 266, ring 278, and assembly 230 can be dispensed with when using this type of head. Conversely, a ring, comparable to height ring 278 can be mounted on tube 252, in using a gaging head of the type shown at FIG. 12, with dimensional deviations being detected by an assembly comparable to assembly 230, actuated by said ring 376, in which event the entire choke light source 100 and associated circuitry can be dispensed with.

However, a separate height gaging means, such as used in the earlier discussed forms of apparatus, is considered preferable, because of a demonstratable greater degree of accuracy as to height gaged as acceptable and because of the greater capacity for precise adjustment as to a specified height than is possible with a head of the type shown in FIG. 12. Nevertheless, the gaging head of FIG. 12 is capable of simultaneously gaging several dimensional features of an article and is to be recognized as having certain of the features characteristic of the invention.

FIG. 13 presents in fragmentary, vertical cross-section, with certain parts shown in elevation, a view centrally of the spider assembly, emphasizing the means thereof permitting vertical adjustment of the upper spider part. Outer sleeve 112 is splined to shaft 110 and rotates therewith. The top of shaft 110 supports a thrust bearing 378 in turn supporting a key block 380. Key block 380 is adjustably rotatable and lockable on adjustment screw 382 and within sleeve 112, by means of set screw 384 and removal and setting of bolts 386, the relative vertical position of key block 380 on adjustment screw 382 being presettable by rotation of said adjustment screw 382 in key block 380. Threaded block 388 is threaded to screw 382 and supports upper support plate 114. The adjustment thus available by means of rotation of adjustment screw 382 thus varies the vertical position of the upper part of the rotating spider assembly on support plate 114. Non-rotating sleeve 160 is supported by bearing 390 on said support plate 114. Lockable collar portion 392 of yoke 162 non-rotatively retains the upper end of sleeve 160, as shown in FIG. 13, and an upper bearing in which adjustable collar 396 rests completes the assembly and permits rotation of adjustment screw 382 in sleeve 160 when the spider assembly rotates operationally.

The procedure for adjusting the height of the upper part of the spider assembly is as follows. Bolt 386 is removed and collar 396 is loosened, allowing screw 382 to be rotated by a wrench applied at the flattened surface 398 at its upper end. This rotates screw 382 in block 388, elevating or lowering the spider part the desired distance. Then, collar 396 is tightened and bolt 386 is replaced to prevent further rotation of screw 382 in block 388.

FIG. 14 presents a simplified, ladder-type diagram of the control elements and circuity utilized in the operation of the disclosed gaging equipment. As has been indicated, the control circuitry includes a choke detector light source 100, involving a beam transmitter 400 and beam receiver 402, each conventional per se, and an ejection station light source 102, involving a light beam transmitter 404 and a light beam receiver 406, each also conventional per se. Associated in the control circuity with light source 100 is a photoswitch 408, also conventional per se, a Photoelectric Relay Type 21DJ1, manufactured by the Electronics Corporation of America, Cambridge, Mass., being selected by way of example. Similarly, ejection station light source 102 has associated therewith a photoswitch 410, also conventional per se, a Photoelectric Relay Type 20DJ1, also manufactured by the Electronics Corporation of America, likewise being selected by way of example. Basically, photoswitch 408 functions to close connection between terminals 2 and 5 thereof when the beam between transmitter 400 and receiver 402 is interrupted, such connection of said terminals 2 and 5 being shown by broken line. In photoswitch 410, such functions upon interruption of the beam from transmitter 404 and receiver 406 to close connection between terminals 6 and 7 thereof, as likewise indicated by broken line, only when terminals 8 and 9 are closed. Photoswitches 408 and 410 are each energized by connection of power lines L1 and L2 to the terminals 1 and 2 thereof, as shown. As will be understood, the power circuit for the system also includes a startup switch 412 of the double throw type and drive motor 28 for the assembly is connected directly across lines L1 and L2 energized by said switch 412.

Assuming the assembly to be in operation with articles being delivered by infeed star wheel 52 to the article supports 84 and further assuming said articles are dimensionally normal as to choke dimension, then the beam of light source 100 is not broken and no energization of terminal 5 of photoswitch 408 occurs. Meanwhile, even though the upper end of gaging tube 252 of each gaging assembly 118 is interrupting the light beam in light source 102, no energization output occurs at terminal 7 of photoswitch 410 because terminals 8 and 9 thereof are not connected. However, should an article be presented at the gaging station which has a choke constriction, then choke tube 252 is raised at the gaging station to an abnormal height, the beam of light source 100 is broken, terminal 5 of photoswitch 408 is energized and kickout relay 414 is in turn energized in that one side thereof is directly connected to line L1 and the other side thereof is connected through terminals 5 and 2 of photoswitch 408 and line L2. Upon energization, kickout relay 414 closes its contacts A and B, contact A being an interlock contact maintaining energization of kickout relay 414 by connection through reset switch 200 and kickout switch 416 to line L2. Contacts B of kickout relay 414 closes connection between terminals 8 and 9 of photoswitch 410 to, in effect, "enable" the ejection actuation assembly. With kickout relay 414 locked and a closed connection existing between terminals 8 and 9 of photoswitch 410, when the choke tube 252 of the gaging station superimposed over the article having the constricted choke dimension reaches the ejection station and interrupts the beam of light source 102, then connection from terminal 6 of photoswitch 410 to terminal 7 thereof is completed and ejection solenoid valve 186 is energized, delivering fluid under pressure to ejection actuation cylinder 170, moving cam 181 down into the line of travel of ejector arm tip 140 to strike the same, and in turn causing ejector foot 122 to knock the article off its work support 84, the downward movement of rod 176 of cylinder 170, and its associated reset switch actuating cam 190, simultaneously opening reset switch 200, which in turn opens the energization line for kickout relay 414, restoring the contacts A and B thereof to open position, ready for the next energization impulse from photoswitch 408.

Actuation of photoswitch 408 also energizes contact 7 thereof, in turn triggering a unit count in choke counter 418, so that a running count of articles defective as to choke dimension is maintained.

Actuation of height gage microswitch 304 by movement of height gage plate 292 when presented with an overheight or underheight article also functions to energize kickout relay 414 through line 420, whereupon contacts A and B thereof close, likewise "enabling" photoswitch 410 by closure of terminals 8 and 9 thereof so that the choke tube 252 when interrupting the beam of light source 102 initiates energization of terminal 7 of photoswitch 410 and consequently energization of ejection solenoid valve 186 in like manner as before, after which the article ejection and reset sequence likewise occur as before. When microswitch 304 is actuated, the switch momentarily deenergizes a height counter 422 from which a running count of articles non-dimensionally uniform as to height is available. As will be readily understood, counters 418 and 422 are of a type conventional per se, such as are manufactured by the Veeder-Root, Inc., of Hartford, Conn.

Kickout switch 416 is manually available to disable the ejection mechanism and circuit at any time under the control of the equipment operator.

The various electrical control components are advantageously arranged in a control panel 424 (FIG. 1) mounted on uprights 22 of the frame of the assembly.

With respect to the typical embodiments of the assembly, the typical control circuitry and typical gaging heads and gaging assembly arrangements disclosed, it will be manifest to those skilled in the art that various other forms, modifications and/or elemental arrangements can be employed in the practice of the invention. Thus, for example, while an article supporting and conveying mechanism involving work supports mounted on a rotating spider has been found advantageous in terms of simplicity and uniformity of parts and reliability of operation, clearly many of the gaging features and principles of the invention can be employed with so-called "in line" article conveyancing equipment, one important consideration being in this regard that the articles be elevated along a line of travel while supported on individually elevatable article supports, the line of travel being past a gaging station or gaging stations where both choke and height (including crown) dimensions are gaged substantially simultaneously with the path of travel subsequent to the gaging station encountering an ejection station where the ejector actuating mechanism is enabled either by a choke dimension responsive impulse or a height (or crown finish) dimension responsive impulse. Likewise, while position detector means for the various gaging elements have been employed which are of an electronic nature, it will be readily understood that certain forms and adaptations involving some or all of the features of the present invention can include mechanical or other electronic position detection means. Also, it will be apparent that certain embodiments of the invention can employ various combinations as to the article dimensions gaged, gaging choke dimension and any one or more of the various height and crown or like finishes of an article. Many variations to adapt the gaging and article handling elements to other articles of varying sizes and configuration will also be evident.

From the foregoing, various further adaptations, modifications, variations, rearrangements and/or uses of equipments embodying the invention will be realized by those skilled in the art, within the scope of the following claims.

What is claimed is:

1. A gaging apparatus for bottles or the like articles comprising an elemental arrangement wherein each article is conveyed along a generally horizontal path of travel on an article support and moved vertically by the article support into an associated gaging assembly moving horizontally in superposed relation with said article support, said gaging assembly comprising choke dimension gaging means arranged to yield vertically a predetermined extent only when encountering an article with an abnormal choke dimension, and height dimension gaging means mounted in concentric, surrounding relation to said choke dimension gaging means and vertically yieldable independently thereof, and means responsive to deviant positions of either of said gaging means causing ejection of said article from said path of travel.

2. A gaging apparatus for bottles or like articles comprising an elemental arrangement wherein each article is conveyed along a generally horizontal path of travel on an article support and moved vertically by the article support into an associated gaging assembly moving horizontally in superposed relation with said article support, said gaging assembly comprising choke dimension means arranged to yield vertically a predetermined extent only when encountering an article with an abnormal choke dimension, and including a finger-like element moved relatively into the neck of the article while it progressed along said path of travel, and height dimension gaging means including a gaging head having a surface contacting the sealing surface of said article to detect the height thereof, said height dimension gaging means being mounted in concentric, surrounding relation to said choke dimension gaging means and being vertically liftable independently of said choke dimension gaging means when engaged by a bottle.

3. A gaging apparatus according to claim 2, wherein said gaging head further comprises a bore dimension gaging oversize and out of round of the locking ring of the article.

4. A gaging apparatus according to claim 3, wherein said gaging head further comprises a second bore dimension disposed to gage oversize and out of round of the reinforcing ring of the article.

5. A gaging apparatus according to claim 2, wherein said height gaging means includes a gaging head arranged substantially concentrically of said finger-like element of the choke gaging means, and further comprises a vertically yieldable ejection sleeve situated concentrically between said finger-like element and said gaging head, contacting the sealing surface of said article.

6. A gaging apparatus according to claim 5, wherein said ejection sleeve is spring loaded downwardly to facilitate retraction of the neck of the article from the gaging head after gagement thereof.

7. A gaging apparatus according to claim 2, wherein the finger-like element of said choke gaging means and the gaging head of said height gaging means are integrally arranged to reflect any dimensional deviation of the article as to its choke, height, locking ring and reinforcing ring dimensions in terms of relative vertical position of said gaging assembly.

8. A gaging apparatus according to claim 2, further comprising an article ejection station along the path of travel of said articles, and means responsive to abnormal positions of either said choke gaging means or said height gaging means to eject a dimensionally deviant article when the article is at said ejection station.

9. In a gaging apparatus for bottles or like articles wherein each article is conveyed along a path of travel and moved vertically by an article support into an associated gaging assembly at a gaging station and subsequently withdrawn therefrom at an ejection station where dimensionally deviate articles are removed from said path of travel, automatic article gaging and ejection mechanism and control circuitry comprising a vertically movable gaging element in said gaging assembly moved vertically a predetermined extent only in response to an abnormal choke dimension of an article, a second vertically movable element in said gaging assembly, arranged concentrically of said first gaging element and vertically movable independently thereof responsively to height of the article, adjustable means sensing the verticle position of said first element at said gaging station, adjustable means sensing the vertical position of said second element at said gaging station, article kickout means enabled by either said position sensing means, said article kickout means being actuated upon arrival of the said gaging assembly associated with the dimensionally deviant article at the ejection station.

10. Apparatus according to claim 9, wherein said means detecting the vertical position of said first element includes a light source and a photoelectric relay responsive to same.

11. Apparatus according to claim 9, wherein said means responsive to the relative vertical position of said second element of the gaging assembly includes a gage plate deflected only when an article dimensionally deviant as to height is presented at said gaging station, switch means closed by said gage plate when deflected, a kickout relay energized by said switch means, and article ejection actuation means enabled to said kickout relay and actuated on arrival of the gaging assembly associated with the dimensionally deviant article at the ejection station.

12. Apparatus according to claim 9, wherein said height gaging means comprises a vertically elevated sleeve, a gaging head mounted at the lower end of said sleeve, a gaging ring mounted exteriorly of said sleeve, and said height deviant detecting mechanism further comprises a cam plate, a slot in the end of said cam plate and switch means closed when said cam plate is actuated by the height ring gaging assembly on the accasion of overheight or underheight of the article at the gaging station, the said height ring passing through said slot when the height dimension of the article is the desired demension.

13. Apparatus for gaging several dimensions of an article such as a bottle or the like, comprising means subjacently supporting an article and conveying same along a path of travel at a progressively higher level until reaching a predetermined level coinciding with a gaging station, a gaging assembly superposed over and moving along with the article thus conveyed, said gaging assembly including gravitationally loaded height gaging choke dimension detecting means vertically elevated only when the article presents any vertical elevation of said choke dimension gaging means, and means at said gaging station for detecting overheight and underheight of said article, said height gaging means comprising a hollow bore element mounted concentrically of said choke dimension detecting means so as to be vertically movable independently thereof.

14. Article gaging apparatus functioning to measure several dimensions of a container type article such as a bottle or the like for uniformity within predetermined tolerance ranges, said apparatus comprising means individually supporting and uprightly conveying the article for a time with the bottom thereof initially at a predetermined level then elevating the article so supported for a time at a predetermined higher level, and then returning the article to its initial level, and an article gaging station at one point in the path of travel of said articles when at said higher level, an article ejection station where dimensionally deviant articles are removed from the supporting and conveying means after return thereof to said initial level, a gaging assembly at said gaging station comprising a choke dimension gaging means moving horizontally with each said article and having a probe-like element fitting within the mouth of said article and seeking a vertical position related to the occurrence of an obstruction in the mouth of said article, said gaging assembly being of a length to be clear of the article when such is at said initial level and further comprising a height dimension gaging means concentrically surrounding and upwardly movable independently of said choke dimension gaging means, having a gaging head contacting the upper rim of the article and vertically positioning an exteriorly arranged cam means on said gaging assembly according to the height of said article, means detecting the vertical position of said choke dimension gaging means, when the article is elevated therearound, means detecting the vertical position of said height responsive cam means, a detection means situated at said ejection station functioning to detect the arrival of each gaging assembly thereat, means actuated by either the choke detector means or the height deviation detector means functioning to enable an output impulse from the detector means at said ejection station, and means energized by such output impulse to actuate the ejection means situated at said ejection station.

15. Apparatus according to claim 14, wherein said article height gaging head, forming a part of said gaging assembly, comprises recessed faces dimensioned to fit around certain of the crown finish dimensions of said article.

16. In combination with means conveying a bottle along a path of travel and elevating same while such is being gaged as to height, a gaging assembly superposed over and moving synchronously with the bottle, said gaging assembly comprising a gage support means above the bottle and moved along therewith at a fixed level, a gaging sleeve depending concentrically from and vertically elevatable on said gage support means, choke gaging means mounted concentrically within said gaging sleeve so as to be independently vertically elevatable relative to said gage support means, a gaging head mounted at the lower end of said sleeve, into which the bottle opening can seat, a gaging ring mounted exteriorly of said sleeve, a cam plate, a slot in the end of said cam plate disposed in the path of travel of said gaging ring at a position to permit passage of said ring through said slot only when a bottle seated in said gaging head is of the proper height, and switch means closed when said cam plate is actuated by the height ring of the gaging assembly on the occasion of overheight or underheight of the bottle.

17. A bottle gaging assembly including choke dimension detecting means and means concentrically surrounding and vertically movable independently of said choke dimension detecting means for substantially simultaneously detecting overheight or underheight of said article.

18. In a bottle gaging assembly, a gaging head having ledge means detecting the height of a bottle, a first interior bore adjoining said ledge means for gaging oversize of the locking ring of a bottle, a second interior bore concentric with said first bore for gaging oversize of the reinforcing ring of the bottle, said bores in turn being concentrically arranged about and telescopically movable with respect to proble-like means simultaneously but independently gaging the interior neck dimension of the bottle.

19. A bottle gaging assembly for gaging choke and height dimensions of a bottle conveyed therebelow and momentarily elevated to engage same, said gaging assembly comprising a guide sleeve, a choke gage vertically movable within said guide sleeve and gravitationally resting therein at a predetermined level to be lifted by the bottle when the bottle has a choke dimension restriction, a height gage secured externally of said guide sleeve by means permitting such to be vertically movable thereon and normally gravitationally depend therefrom at a predetermined level to be lifted by and sense the height of said bottle when elevated.

20. A bottle gaging assembly according to claim 19, wherein said choke gage at the bottle contacting lower end thereof comprises an essentially blunt plug of circular cross section, and said height gage at the bottle contacting lower end thereof comprises an inwardly and upwardly sloping lower face to facilitate centering of the bottle with respect to the choke gage plug as the bottle is raised toward the plug.

21. In a bottle gaging and reject ejection mechanism having separate but simultaneously acting, concentrically arranged choke dimension and height dimension gaging means operating at a gaging station, and having ejection mechanism operating at an ejection station subsequently reached by bottles as they are conveyed along a predetermined path of travel, the improvement comprising ejection mechanism control means including a first detection means at said gaging station sensing deviant positions of said choke gaging means, a second detection means at said gaging station sensing deviant positions of said height gaging means, voltage responsive means energized by either said detection means upon a deviant position occurrence of either said choke gaging means or said height gaging means, a normally disabled, third detection means at said ejection station, and circuit means enabling said third detection means upon energization of said voltage responsive means, said bottle ejection mechanism being actuated upon arrival of a deviantly dimensioned bottle at said ejection station by encounter of the bottle with a part of the thus enabled third detection means.

22. Mechanism according to claim 21, wherein said choke dimension gaging means comprises an upright element moved upwardly above a predetermined level upon said gaging means encounters a choke dimension restriction in a bottle, and said first detection means comprises light beam transmitting means situated slightly above said predetermined level.

23. Mechanism according to claim 21, wherein said choke dimension gaging means comprises a vertically movable upright element having a predetermined path of travel at the ejection station, and said third detection means comprises light beam transmitting means situated with the light beam thereof in the path of travel of said upright element.

24. Mechanism according to claim 21, wherein said second detection means comprises a microswitch mechanically actuated only when said second detection means senses a bottle of deviant height dimension.

References Cited in the file of this patent

UNITED STATES PATENTS

| | | |
|---|---|---|
| 2,293,586 | Bardit | Aug. 18, 1942 |
| 2,352,091 | Fedarchak et al. | June 20, 1944 |
| 2,368,796 | Ardell | Feb. 6, 1945 |
| 2,407,062 | Darrah | Sept. 3, 1946 |
| 2,578,573 | Mills | Dec. 11, 1951 |
| 2,596,342 | McNutt | May 13, 1952 |
| 2,606,657 | Berthelsen | Aug. 12, 1952 |